US012439350B2

(12) United States Patent
Kai et al.

(10) Patent No.: US 12,439,350 B2
(45) Date of Patent: Oct. 7, 2025

(54) TERMINAL AND COMMUNICATION NODE

(71) Applicant: NTT DOCOMO, INC., Tokyo (JP)

(72) Inventors: Kenji Kai, Tokyo (JP); Tianyang Min, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 337 days.

(21) Appl. No.: 17/631,224

(22) PCT Filed: Jul. 30, 2019

(86) PCT No.: PCT/JP2019/029903
§ 371 (c)(1),
(2) Date: Jan. 28, 2022

(87) PCT Pub. No.: WO2021/019701
PCT Pub. Date: Feb. 4, 2021

(65) Prior Publication Data
US 2022/0303923 A1    Sep. 22, 2022

(51) Int. Cl.
*H04W 56/00*    (2009.01)
*H04W 36/00*    (2009.01)

(52) U.S. Cl.
CPC ...... *H04W 56/001* (2013.01); *H04W 36/0011* (2013.01); *H04W 36/0064* (2023.05)

(58) Field of Classification Search
CPC ..... H04W 48/00; H04W 48/08; H04W 48/16; H04W 48/17; H04W 48/18; H04W 48/02; H04W 48/04
See application file for complete search history.

(56) References Cited

FOREIGN PATENT DOCUMENTS

WO    WO-2018208197 A1 * 11/2018   ............ H04J 3/0641

OTHER PUBLICATIONS

Qualcomm Incorporated; "Discussion on LS TSN integration in the 5G System", 3GPP TSG-RAN WG3 Meeting#101bis, R3-185963; Chengdu, China, Oct. 8-12, 2018 (6 pages).
Office Action issued in the counterpart Chinese Application No. 201980098773.9, mailed Sep. 16, 2023 (13 pages).
International Search Report issued in PCT/JP2019/029903 on Feb. 25, 2020 (3 pages).
Written Opinion of the International Searching Authority issued in PCT/JP2019/029903 on Feb. 25, 2020 (4 pages).
3GPP TR 23.734 V16.2.0; "3rd Generation Partnership Project; Technical Specification Group Services and System Aspects; Study on enhancement of 5G System (5GS) for vertical and Local Area Network (LAN) services (Release 16)"; Jun. 2019 (8 pages).
Samsung; "Reference Timing Delivery for Industrial Iot"; 3GPP TSG-RAN WG2 Meeting #105, R2-1902178; Athens, Greece; Feb. 25-Mar. 1, 2019 (2 pages).

(Continued)

*Primary Examiner* — Diana J. Cheng
(74) *Attorney, Agent, or Firm* — Osha Bergman Watanabe & Burton LLP

(57) ABSTRACT

A terminal (100) is connected to an NR network that communicates with TSN. The terminal (100) includes a transmitting unit (101) that transmits to the NR network in which NR time is used, a message for requesting for delivery of TSN time used in the TSN, and a receiving unit (103) that receives the TSN time from the NR network by using Dedicated Signaling.

7 Claims, 11 Drawing Sheets

(56) References Cited

OTHER PUBLICATIONS

CMCC; "Accuracy, Unicast signalling and Delivery options of Reference Time"; 3GPP TSG-RAN WG2 Meeting #105, R2-1901976; Athens, Greece; Feb. 25-Mar. 1, 2019 (8 pages).

3GPP TS 36.331 V15.6.0; "3rd Generation Partnership Project; Technical Specification Group Radio Access Network; Evolved Universal Terrestrial Radio Access (E-UTRA); Radio Resource Control (RRC) Protocol specification (Release 15)"; Jun. 2019 (960 pages).

3GPP TR 23.734 V16.0.0; "3rd Generation Partnership Project; Technical Specification Group Services and System Aspects; Study on enhancement of 5GS for Vertical and LAN Services (Release 16)"; Dec. 2018 (107 pages).

\* cited by examiner

TERMINAL AND COMMUNICATION NODE

TECHNICAL FIELD

The present invention relates to a terminal and a communication node that transmit and receive time information to and from each other.

BACKGROUND ART

The 3rd Generation Partnership Project (3GPP) specifies Long Term Evolution (LTE), and specifies LTE-Advanced (hereinafter collectively referred to as LTE) for the purpose of further speeding up LTE. In addition, in the 3GPP, specifications of a succession system of LTE, referred to as 5G, New Radio (NR) or the like, have been studied.

With LTE, a network delivers time information for use in LTE to a terminal by using broadcast information or dedicated signaling for time delivery (hereinafter, referred to as Dedicated Signalling) (see Non Patent Document 1).

Specifically, the terminal uses a terminal capability (hereinafter, referred to as Capability) to notify the network of whether the terminal supports Dedicated Signalling.

Upon recognizing that the terminal which has provided notification of the Capability can support Dedicated Signalling, the network performs time delivery by using Dedicated Signalling.

Also with NR, the use of the broadcast information or Dedicated Signalling for the delivery of the time information for use in NR from the network to a terminal, as in the case of LTE, is under consideration.

Furthermore, in Time-Sensitive Networking (TSN) enabling highly accurate time synchronization between a controller and an end station for the industrial Internet of things (IoT), delivery of the time information from the controller to the end station via an NR system is under consideration (see Non Patent Document 2).

In particular, Non Patent Document 2 includes a discussion about delivery of time information for use in TSN from a communication node, including a radio base station, to a terminal supporting TSN in an NR system, using conventional time delivery.

PRIOR ART DOCUMENT

Non-Patent Document

Non Patent Document 1: 3GPP TS 36.331 V15.6.0 3rd Generation Partnership Project; Technical Specification Group Radio Access Network; Evolved Universal Terrestrial Radio Access (E-UTRA); Radio Resource Control (RRC); Protocol specification (Release 15), 3GPP, June 2019 Non Patent Document 2: 3GPP TR 23.734 V16.0.0 3rd Generation Partnership Project; Technical Specification Group Services and System Aspects; Study on enhancement of 5GS for Vertical and LAN Services (Release 16), 3GPP, December 2018

SUMMARY OF THE INVENTION

However, application of conventional time delivery to a terminal supporting TSN has the following problem.

Specifically, even if the terminal notifies the communication node of the fact that it supports Dedicated Signalling, the communication node is unable to determine which of time information for use in the NR network and time information for use in the TSN network is to be delivered. Thus, time information requested by the terminal might fail to be delivered.

The present invention has been made in view of such a situation, and it is an object of the present invention to provide a terminal and a communication node that enable transmission and reception of time information requested by a terminal supporting a particular network, by using dedicated signaling.

A terminal (100) according to one aspect of the present invention is connected to a wireless network communicating with a particular network, and includes: a transmitting unit (101) that transmits a message to the wireless network in which second time information is used, the message being used for requesting for delivery of first time information used in the particular network; and a receiving unit (103) that receives the first time information from the wireless network by using dedicated signaling.

A communication node (210, 210a) according to one aspect of the present invention includes: a receiving unit (213) that receives subscription information about a terminal (100) supporting a particular network; a controlling unit (217) that determines to deliver time information used in the particular network to the terminal (100), based on the subscription information; and a transmitting unit (211) that transmits the time information to the terminal (100) by using dedicated signaling.

A communication node (210, 210a) according to one aspect of the present invention includes: a receiving unit (213) that receives a handover request message including subscription information about a terminal (100) supporting a particular network; a controlling unit (217) that determines to deliver time information used in the particular network to the terminal (100), based on the subscription information; and a transmitting unit (211) that transmits the time information to the terminal (100) by using dedicated signaling when the terminal (100) is handed over to the communication node (210, 210a).

BRIEF DESCRIPTION OF DRAWING

FIG. 9 is a diagram schematically illustrating an overall configuration of a control system 10a.

FIG. 12 is a diagram illustrating an example of a hardware configuration of the terminal 100 and the communication nodes 210, 220, 210a, and 220a.

MODES FOR CARRYING OUT THE INVENTION

Figure 1:
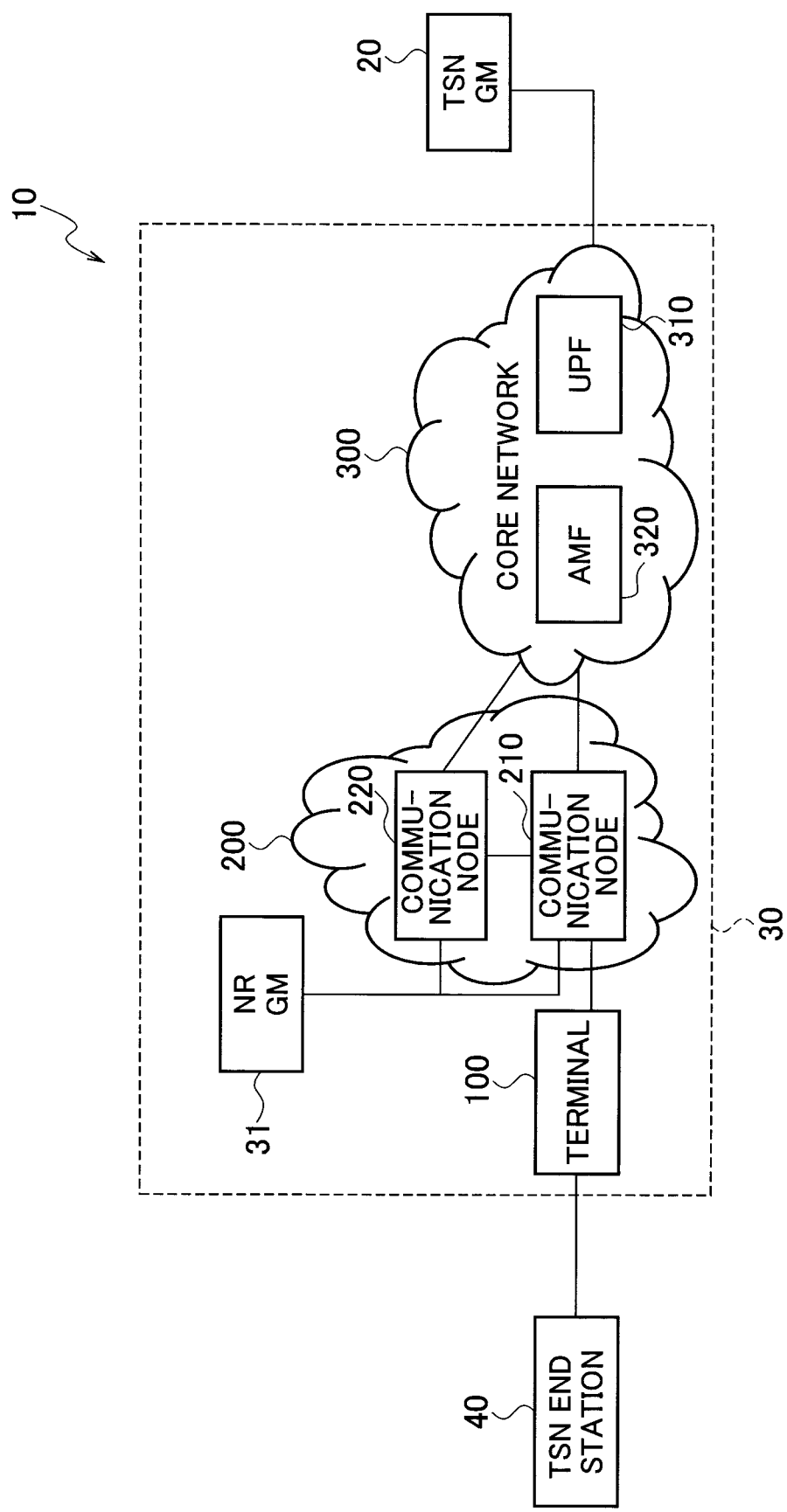
FIG. 1 is a diagram schematically illustrating an overall configuration of a control system 10.

Hereinafter, embodiments will be described with reference to the drawings. The same functions and configurations are denoted by the same or similar reference numerals, and description thereof is omitted as appropriate.

(1) Overall Schematic Configuration of Control System

FIG. 1 is a diagram schematically illustrating an overall configuration of a control system 10 according to an embodiment.

The control system 10 includes a TSN grand master (TSN GM) 20, an NR system 30, and a TSN end station 40. In the control system 10, a TSN controller (not illustrated) controls the TSN end station 40 in real time via the NR system 30. Note that the specific configuration of the control system 10, including the numbers of the TSN GMs 20 and of the TSN end stations 40, is not limited to the example illustrated in FIG. 1.

The TSN GM 20 implements oscillation of clock on which an operation timing of the TSN is based. Hereinafter, the time generated based on the clock oscillated by the TSN GM 20 is referred to as TSN time. The TSN time is a reference time to be applied in the TSN. Note that the TSN time may be referred to as time information for use in the TSN.

The TSN time is used to high-accurately synchronize time between the TSN controller and the TSN end station 40. Therefore, the TSN controller and the TSN end station 40 need to synchronize with the TSN time.

Note that TSN may be referred to as a particular network. Further, the TSN may be referred to as a network in which all nodes included in the network share the same time. Furthermore, the TSN may be referred to as a network supporting deterministic communication or a network supporting isochronous communication.

The NR system 30 includes an NR grand master (NR GM) 31, a terminal 100, a Next Generation-Radio Access Network 200 (hereinafter, NG-RAN 200), and a core network 300. Note that the terminal is also referred to as user equipment (UE). Further, the specific configuration of the NR system including the number of terminals and the number of communication nodes described below is not limited to the example illustrated in FIG. 1.

The NR GM 31 implements oscillation of a clock on which the operation timing of the NR system 30 is based. Hereinafter, the time generated based on the clock oscillated by the NR GM 31 is referred to as NR time. The NR time is a reference time to be applied in the NR system 30. Note that the NR time may be referred to as time information for use in the NR system 30.

The terminal 100 performs wireless communications, based on the NR, with the NG-RAN 200 and the core network 300. The terminal 100 transmits Capability indicating that it supports Dedicated Signalling for time delivery, to the NG-RAN 200 or the core network 300.

The terminal 100 supports TSN. When the terminal 100 is used for the NR communication service, the terminal 100 synchronizes with the NR time. When the terminal 100 is used for a TSN communication service, the terminal 100 synchronizes with the TSN time.

The NG-RAN 200 includes a plurality of NG-RAN Nodes (specifically, gNBs (or ng-eNBs)), and is connected to the core network (5GC) 300 based on NR. Note that the NG-RAN 200 and the core network 300 may be simply referred to as "NR network". The terminal 100 is connected to an NR network that communicates with the TSN GM 20. The NR network may be referred to as a wireless network.

The NG-RAN 200 includes communication nodes 210 and 220. Each of the communication nodes 210 and 220 is a gNB or an ng-eNB.

The communication nodes 210 and 220 are connected to the NR GM 31. When the terminal 100 is connected to the communication node 210 to be used for the NR communication service, the communication node 210 transmits the NR time to the terminal 100. Upon receiving the NR time, the terminal 100 synchronizes with the NR time.

The terminal 100 and the communication nodes 210 and 220 can support Massive MIMO in which a more highly directional beam is generated, carrier aggregation (CA) in which a plurality of component carriers (CC) is used, dual connectivity (DC) for simultaneously transmitting CCs between a plurality of NG-RAN Nodes and a terminal, and the like, by controlling a radio signal to be transmitted from a plurality of antenna elements. Note tha the CC is also referred to as a carrier.

The core network 300 communicates with UE 100 via at least one of the communication nodes 210 and 220. The core network 300 includes a User Plane Function (UPF) 310 and an Access and Mobility management Function (AMF) 320.

The UPF 310 provides a function dedicated to user plane processing. The AMF 320 performs mobility management for the terminal 100, in the control plane processing.

The core network 300 receives the TSN time from the TSN GM 20 via the UPF 310. The core network 300 transmits the received TSN time to the communication nodes 210 and 220. Note that the communication nodes 210 and 220 may receive the TSN time directly from the TSN GM 20.

The core network 300 retains terminal TSN subscription information. Terminals registered in the TSN subscription information support TSN and their use by TSN is permitted. The TSN subscription information may be referred to as TSN contract information.

As described later, when the terminal 100 is connected to the communication node 210 and used for the communication service of TSN, the communication node 210 delivers the TSN time to the terminal 100 through at least one of the following operations. In this case, the communication node 210 does not deliver the NR time to terminal 100.

When a message for requesting for the delivery of TSN time is received from the terminal 100, the communication node 210 delivers the TSN time to the terminal 100 by using Dedicated Signalling.

When the terminal 100 is registered in the terminal TSN subscription information received from the core network 300, the communication node 210 delivers the TSN time to the terminal 100 by using Dedicated Signalling.

When the message for requesting for the delivery of TSN time is received from the terminal 100 and the terminal 100 is registered in the terminal TSN subscription information received from the core network 300, the communication node 210 delivers the TSN time to the terminal 100 by using Dedicated Signalling.

The "message for requesting for delivery of TSN time" may be referred to as a "message for requesting for a TSN communication service".

Upon receiving the TSN time from the communication node 210, the terminal 100 synchronizes with the TSN time and transmits the TSN time to the TSN end station 40.

The TSN end station 40 is, for example, a machine provided in a production factory. The TSN end station 40 updates the TSN time retained by the TSN end station 40 at an appropriate timing based on the TSN time received from the terminal 100.

The TSN end station 40 receives a command from the TSN controller via the NR system 30. The TSN controller performs time scheduling for operating the TSN end station 40 based on the TSN time, whereby real-time control is implemented by the control system 10.

The terminal 100 is in one of an idle state, an active state, and an inactive state. The terminal 100 can transition between the idle state and the active state. The terminal 100 can transition between the inactive state and the active state. The terminal 100 can transition from the inactive state to the idle state.

The terminal 100 is in the idle state in a radio resource control (RRC) layer when the RRC connection is not configured between the terminal 100 and the NG-RAN 200. When the terminal 100 is in the idle state, the terminal 100, the NG-RAN 200, and the core network 300 do not retain parameters (hereinafter, referred to as context information) required for implementing communications between the terminal 100 and the NR network. For this reason, no user data is communicated between the terminal 100 and the NR network. The context information includes, for example, a Cell-Radio Network Temporary Identifier (C-RNTI).

When it becomes necessary for the terminal 100 in the idle state to communicate user data, the terminal 100 needs to transition from the idle state to the active state. In this process, the terminal 100 performs cell selection or cell reselection, and the terminal 100, the NG-RAN 200, and the core network 300 share context information.

On the other hand, when the RRC connection is configured between the terminal 100 and the NG-RAN 200, the terminal 100 is in the active state or the inactive state in the RRC layer.

When the terminal 100 is in the active state, the terminal 100, the NG-RAN 200, and the core network 300 retain the context information. When terminal 100 is in the active state, the NR network can identify the terminal 100 at the cell level subordinate to the NG-RAN Node. Therefore, the terminal 100 can transmit and receive user data to and from the NR network.

When the terminal 100 is in the inactive state, the terminal 100, the NG-RAN 200, and the core network 300 retain the context information. However, when terminal 100 is in the inactive state, the NR network cannot identify the terminal 100 at the cell level subordinate to the communication node 210. For this reason, no user data is communicated between the terminal 100 and the NR network.

When it becomes necessary for the terminal 100 in the inactive state to communicate user data, the terminal 100 needs to transition from the inactive state to the active state. In this process, the terminal 100 performs cell selection or cell reselection.

As described above, when the terminal 100 is in the inactive state, each node of the NR network retains the context information without discarding it. Thus, a step required for return to the active state can be omitted which is required in a case where the terminal 100 is in the idle state.

When the terminal 100 is connected to the communication node 210, the communication node to which the terminal 100 is connected can be switched from the communication node 210 to the communication node 220 in accordance with a movement of the terminal 100. This switching is referred to as Xn handover.

Each of the communication nodes 210 and 220 can modify context information it retains in response to a request from the core network 300.

Each of the communication nodes 210 and 220 can transmit the context information it retains to the other communication node in response to a request from the other communication node.

(2) Functional Block Configuration of Control System

Next, a functional block configuration of the control system 10 will be described. Specifically, a functional block configuration of the terminal 100 and the communication nodes 210 and 220 in the NR system 30 will be described. Hereinafter, only portions related to the features in the present embodiment will be described. Thus, it is a matter of course that the terminal 100 and the communication nodes 210 and 220 include other functional blocks not directly related to the features of the present embodiment.

Figure 2:
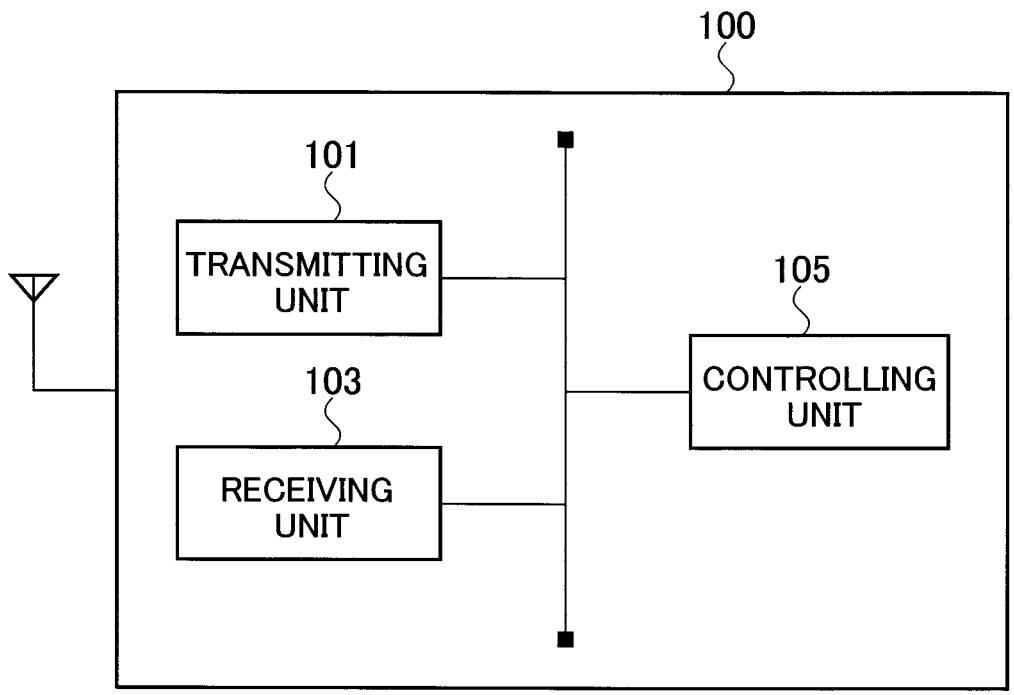
FIG. 2 is a diagram illustrating a functional block configuration of a terminal 100.

FIG. 2 is a diagram illustrating a functional block configuration of the terminal 100. The hardware configuration of the terminal 100 will be described later. As illustrated in FIG. 2, the terminal 100 includes a transmitting unit 101, a receiving unit 103, and a controlling unit 105.

When the terminal 100 is connected to the communication node 210, the transmitting unit 101 transmits a message for requesting for the delivery of TSN time to the communication node 210.

For example, as described later, in a time delivery procedure 1 and a time delivery procedure 2, the transmitting unit 101 transmits the message for requesting for the delivery of TSN time to the communication node 210 in a step before a step of configuring a radio bearer between the terminal 100 and the communication node 210.

When the terminal 100 is connected to the communication node 210, the receiving unit 103 receives the TSN time from the communication node 210 by using Dedicated Signalling.

The controlling unit 105 causes the transmitting unit 101 to transmit the message for requesting for the delivery of TSN time at a specified timing.

For example, as described later, in the time delivery procedure 1 and the time delivery procedure 2, the controlling unit 105 causes the transmitting unit 101 to transmit the message for requesting for the delivery of TSN time in a step before a step of configuring a radio bearer between the terminal 100 and the communication node 210.

Figure 3:
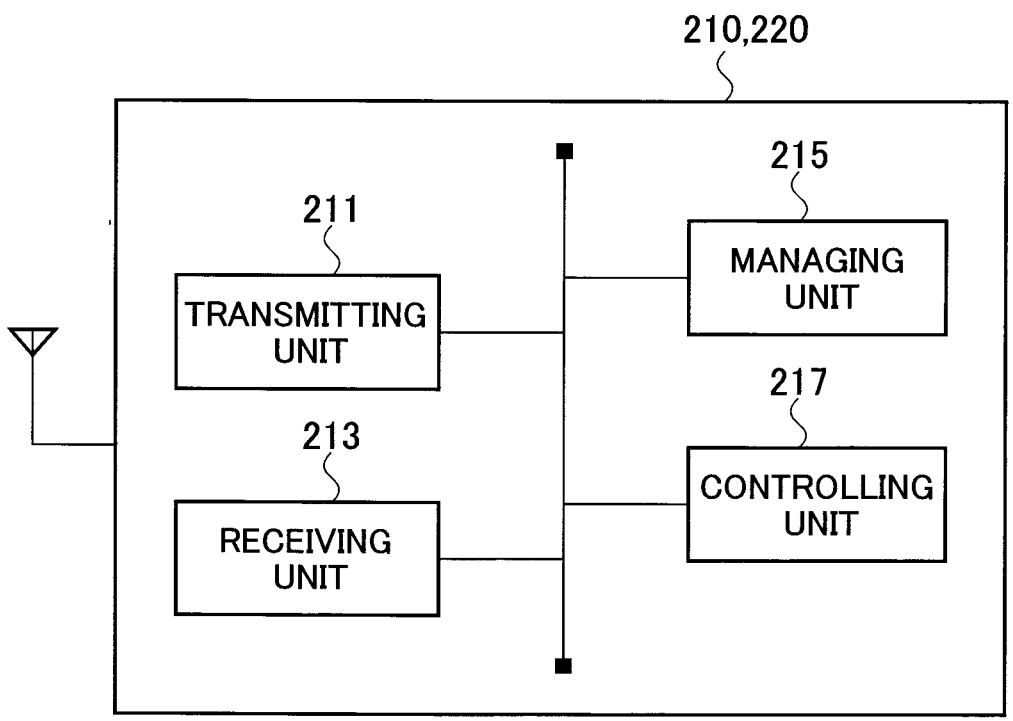
FIG. 3 is a diagram illustrating a functional block configuration of communication nodes 210 and 220.

FIG. 3 is a diagram illustrating a functional block configuration of the communication nodes 210 and 220. The hardware configuration of the communication nodes 210 and 200 will be described later. Since the communication nodes 210 and 220 have the same configuration, the description of the communication node 220 will be omitted. As illustrated in FIG. 3, the communication node 210 includes a transmitting unit 211, a receiving unit 213, a managing unit 215, and a controlling unit 217.

The transmitting unit 211 transmits the TSN time to the terminal 100 by using Dedicated Signalling. The transmitting unit 211 transmits Dedicated Signalling in which the TSN time is set to the terminal 100 using, for example, a radio bearer for delivery of TSN time.

The receiving unit 213 receives, from the terminal 100, a message for requesting for the delivery of TSN time. The receiving unit 213 receives, from the core network 300, the terminal TSN subscription information.

When the terminal 100 is connected to the communication node 220, the receiving unit 213 receives a handover request message, including the terminal TSN subscription information, from the communication node 220. In this case, when the terminal 100 is handed over from the communication node 220 to the communication node 210, the transmitting unit 211 transmits the TSN time to the terminal 100 by using Dedicated Signalling.

The managing unit 215 manages the terminal TSN subscription information received from the core network 300 or the communication node 220.

When the message for requesting for the delivery of TSN time from the terminal 100 is received, the controlling unit 217 determines to deliver the TSN time to the terminal 100 by using Dedicated Signalling.

The controlling unit 217 determines to deliver the TSN time to the terminal 100 by using Dedicated Signalling, based on the terminal TSN subscription information received from the core network 300 or the communication node 220. Specifically, when the terminal 100 is registered in the TSN subscription information, the controlling unit 217 determines to deliver the TSN time to the terminal 100 by using Dedicated Signalling.

When the message for requesting for the delivery of TSN time is received from the terminal 100 and the terminal 100 requesting for the delivery of TSN time is registered in the terminal TSN subscription information received from the core network 300 or the communication node 220, the controlling unit 217 determines to deliver the TSN time to the terminal 100 by using Dedicated Signalling.

(3) Control System Operation

Next, the operation of the control system 10 will be described.

Specifically, a procedure will be described in which the NG-RAN 200 performing the time delivery identifies that the terminal 100 is requesting for the delivery of TSN time, and delivers the TSN time to the terminal 100.

In the present embodiment, the TSN time is delivered by using Dedicated Signalling. An example of Dedicated Signalling includes an RRC message such as a DL Information Transfer message. When using the RRC message, the TSN time is set in information element TimeReferenceInfoList in the RRC message.

(3.1) Time Delivery Procedure 1

First of all, a procedure in which the NG-RAN 200 delivers the TSN time to the terminal 100 in a process in which the terminal 100 transitions from the idle state to the active state, will be described.

(3.1.1) Operation Example 1

Figure 4:
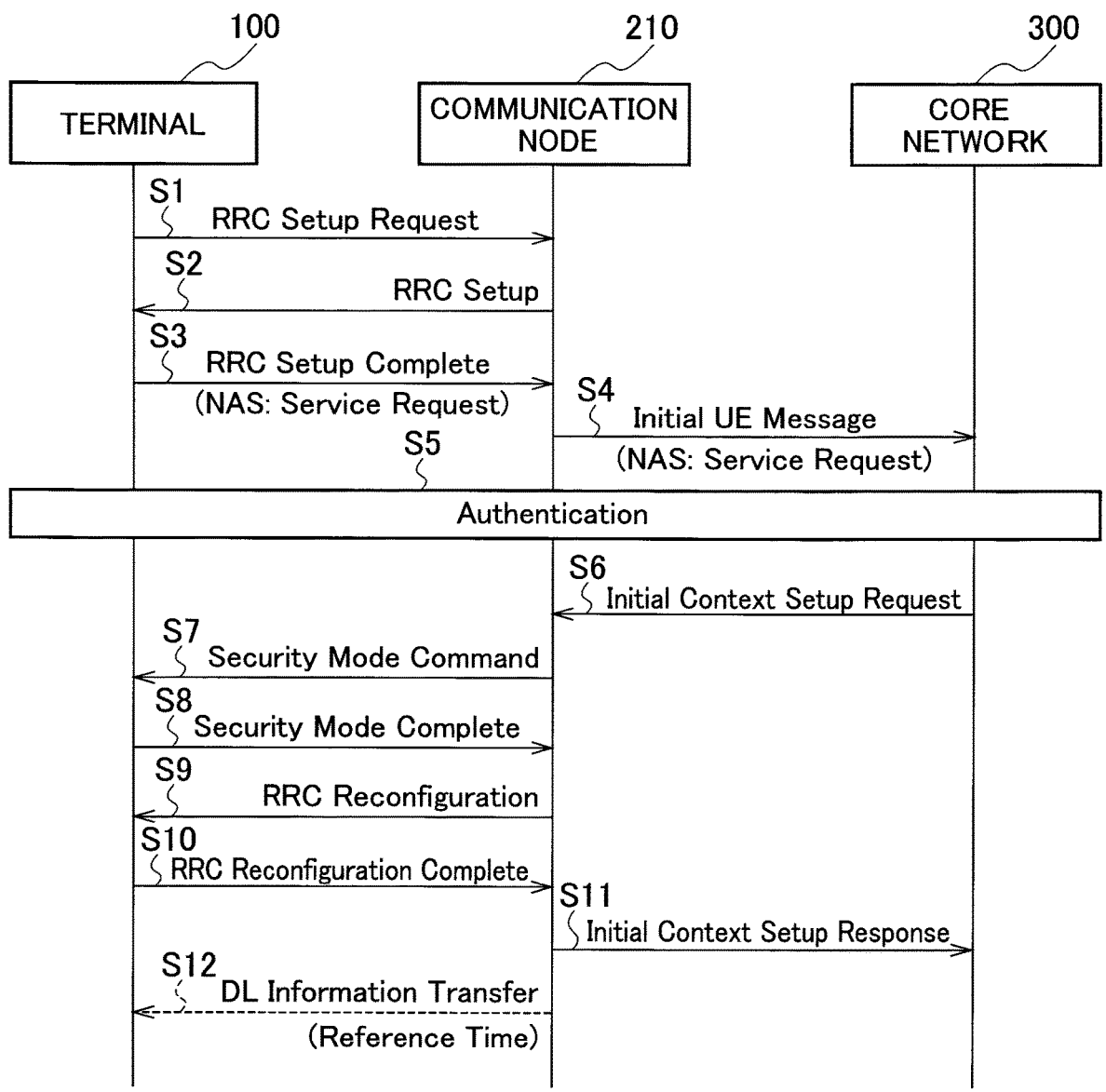
FIG. 4 is a diagram illustrating an example of a sequence of a time delivery procedure 1.

FIG. 4 is a diagram illustrating an example of a sequence of a time delivery procedure in a process in which the terminal 100 transitions from the idle state to the active state. As illustrated in FIG. 4, when performing cell selection and configuring RRC connection between the terminal 100 and the communication node 210, the terminal 100 transmits an RRC setup request message (RRC Setup Request) to the communication node 210 (S1).

In S1, the terminal includes in the RRC Setup Request, information for requesting for the delivery of TSN time. In this case, the RRC Setup Request is also referred to as a message for requesting for delivery of TSN time.

Upon receiving the RRC Setup Request, the communication node 210 configures the RRC connection between the terminal 100 and the communication node 210, and then transmits an RRC setup message (RRC Setup) to the terminal 100, to notify the terminal 100 of RRC connection configuration information (S2).

Upon receiving the RRC Setup, the terminal 100 transmits an RRC setup complete message (RRC Setup Complete) to the communication node 210 to notify the communication node 210 of the completion of the RRC connection configuration based on the RRC connection configuration information (S3). In S3, the terminal 100 transmits the RRC Setup Complete, and Service Request for notifying the core network 300 of an attach request via the communication node 210 by using a Non Access Stratum (NAS) message, to the communication node 210.

The communication node 210 acknowledges that the terminal 100 has received the RRC connection configuration information by receiving the RRC Setup Complete. Upon receiving the Service Request, the communication node 210 transmits an Initial UE Message to the core network 300 by using the NAS message (S4). The Initial UE Message includes the contents of the Service Request.

Upon receiving the Initial UE Message, the core network 300 performs authentication between the terminal 100 and the core network 300 (S5). When the authentication is successful, the core network 300 transmits an initial context setup request message (Initial Context Setup Request) to the communication node 210 (S6).

In S6, the core network 300 includes in the Initial Context Setup Request, Capability indicating that the terminal 100 supports Dedicated Signalling.

Upon receiving the Initial Context Setup Request, the communication node 210 transmits a security mode command message (Security Mode Command) including security information to the terminal 100 so that the security information is shared between the terminal 100 and the communication node 210 (S7). Upon receiving the Security Mode Command, the terminal 100 transmits a security mode complete message (Security Mode Complete) to the communication node 210 to notify the communication node 210 of the reception of the security information (S8).

Upon receiving the Security Mode Complete, the communication node 210 transmits an RRC reconfiguration message (RRC Reconfiguration) including configuration information for implementing communications between the terminal 100 and the communication node 210 (S9). Since the communication node 210 has received the information for requesting for the TSN time delivery from the terminal 100 in S1, the radio bearer to be used for delivering the TSN time between the terminal 100 and the communication node 210, is configured in S9.

Upon receiving the RRC Reconfiguration, the terminal 100 performs configurations for implementing communications between the terminal 100 and the communication node 210, and transmits an RRC reconfiguration complete message (RRC Reconfiguration Complete) (S10).

Upon receiving the RRC Reconfiguration Complete, the communication node 210 transmits an initial context setup response message (Initial Context Setup Response) to the core network 300 (S11). As a result, the terminal 100, the communication node 210, and the core network 300 share parameters (context information) necessary for implementing communications between the terminal 100 and the NR network.

The communication node 210 transmits Dedicated Signaling (for example, a DL Information Transfer message) including the TSN time to the terminal 100 at a proper timing (S12).

As described above, in the present operation example, when the communication node 210 receives the information for requesting for the TSN time delivery from the terminal 100 in S1, the communication node 210 delivers the TSN time to the terminal 100 by using Dedicated Signalling in S12.

(3.1.2) Operation Example 2

In this operation example, the terminal 100 includes in the RRC Setup Complete, the information for requesting for the delivery of TSN time in S3, instead of including in the RRC Setup Request, the information for requesting for the delivery of TSN time in S1.

In this case, upon receiving the information requesting for the delivery of TSN time from the terminal 100 in S3, the communication node 210 delivers the TSN time to the terminal 100 by using Dedicated Signalling in S12.

(3.1.3) Operation Example 3

In this operation example, the core network 300 includes in the Initial Context Setup Request, the terminal TSN subscription information in S6, instead of the information for requesting for the delivery of TSN time being included in the RRC Setup Request by the terminal 100 in S1.

In this case, when the terminal 100 is registered in the terminal TSN subscription information received in S6, in S12, the communication node 210 delivers the TSN time to the terminal 100 by using Dedicated Signalling.

(3.1.4) Operation Example 4

In this operation example, the terminal 100 includes in Service Request, the information for requesting for the delivery of TSN time in S3, instead of the information for requesting for the delivery of TSN time being included in the RRC Setup Request by the terminal 100 in S1.

In this case, the communication node 210 transmits an Initial UE Message including the contents of the Service Request to the core network 300 in S4. Upon receiving the Initial UE Message, the core network 300 determines whether or not the terminal 100 requesting for the delivery of TSN time is registered in the terminal TSN subscription information. When the terminal 100 is registered in the terminal TSN subscription information, the core network 300 transmits Initial Context Setup Request including information for requesting for the TSN time delivery to the communication node 210 in S6.

When receiving the information for requesting for the delivery of TSN time from the core network 300, the communication node 210 delivers the TSN time to the terminal 100 by using Dedicated Signalling in S12. In the present operation example, the information for requesting for the delivery of TSN time is included in the NAS message in S4. Thus, the communication node 210 cannot read the information for requesting for the delivery of TSN time from the terminal 100.

(3.1.5) Operation Example 5

In this operation example, the communication node 210 receives the information for requesting for the delivery of TSN time from the terminal 100 in S1 or S3. The communication node 210 receives the terminal TSN subscription information from the core network 300 in S6.

In this case, when the information for requesting for the delivery of TSN time from the terminal 100 is received in S1 or S3, and the terminal 100 is registered in the terminal TSN subscription information received from the core network 300 in S6, the communication node 210 delivers the TSN time to the terminal 100 by using Dedicated Signalling in S12.

Therefore, even when the information for requesting for the delivery of TSN time is received from the terminal 100 in S1 or S3, the communication node 210 does not deliver the TSN time to the terminal 100 in S12 if the terminal 100 is not registered in the terminal TSN subscription information received from the core network 300 in S6.

(3.1.6) Other

The terminal 100 may include in Security Mode Complete, the information for requesting for the delivery of TSN time in S8, instead of the information for requesting for the delivery of TSN time being included in the RRC Setup Request by the terminal 100 in S1. Thus, it suffices if the terminal 100 can transmit information for requesting for delivery of TSN time to the communication node 210 in a step before S9 in which the radio bearer is configured between the terminal 100 and the communication node 210.

(3.2) Time Delivery Procedure 2

Next, a procedure in which the NG-RAN 200 delivers the TSN time to the terminal 100 in a process in which the terminal 100 transitions from the inactive state to the active state, will described.

(3.2.1) Operation Example 1

Figure 5:
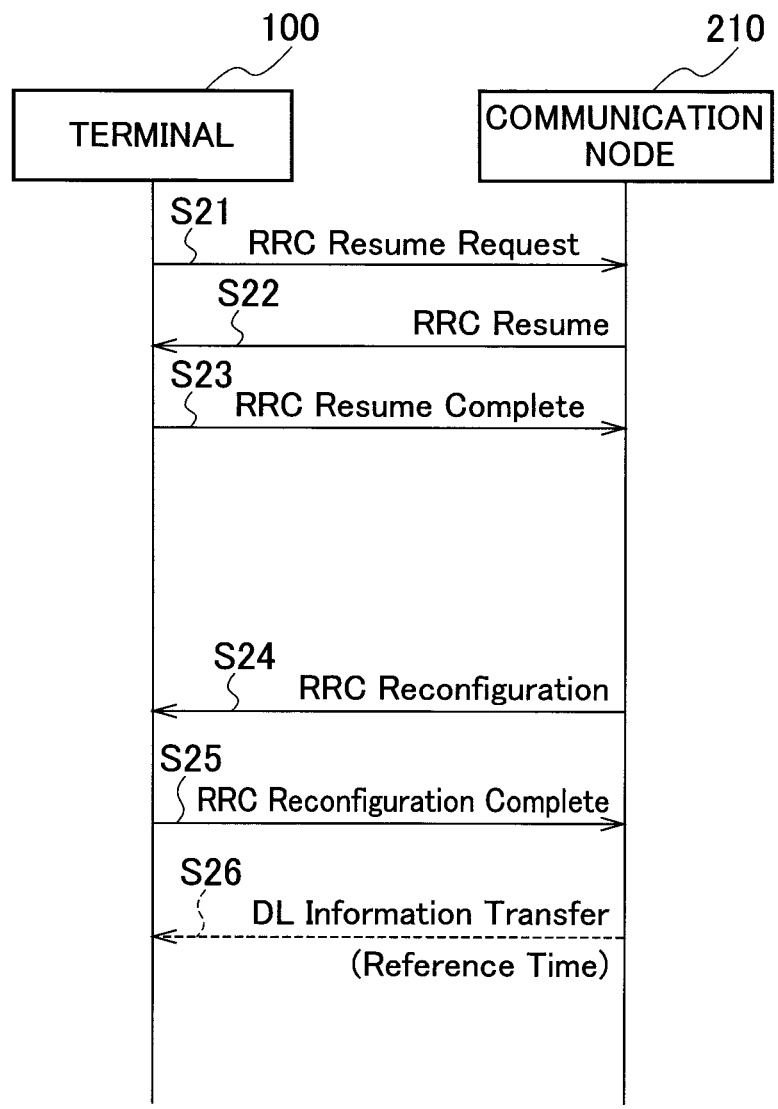
FIG. 5 is a diagram illustrating an example of a sequence of a time delivery procedure 2.

FIG. 5 is a diagram illustrating an example of a sequence of a time delivery procedure in a process in which the terminal 100 transitions from the inactive state to the active state. As illustrated in FIG. 5, the terminal 100 performs cell selection or cell reselection, and in order to request for the recovery (resumption) of the RRC connection between the terminal 100 and the communication node 210, transmits an RRC resume request message (RRC Resume Request) to the communication node 210 (S21).

The terminal 100 includes in The RRC Resume Request, information for requesting for the delivery of TSN time in S21. In this case, the RRC Resume Request is also referred to as a message for requesting for delivery of TSN time.

Upon receiving the RRC Resume Request, the communication node 210 resumes the RRC connection between the terminal 100 and the communication node 210, and then transmits an RRC resume message (RRC Resume) to the terminal 100, to notify the terminal 100 of RRC connection configuration information (S22).

Upon receiving the RRC Resume, the terminal 100 transmits an RRC resume complete message (RRC Resume Complete) to the communication node 210 to notify the communication node 210 of the completion of the RRC resumption based on the RRC connection configuration information (S23).

Upon receiving the RRC Resume Complete, communication node 210 transmits an RRC reconfiguration message (RRC Reconfiguration) including configuration information for implementing communications between the terminal 100 and the communication node 210 (S24). Since the communication node 210 has received the information for requesting for the delivery of TSN time from the terminal 100 in S21, the radio bearer to be used for delivering the TSN time between the terminal 100 and the communication node 210 is configured in S24.

Upon receiving the RRC Reconfiguration, the terminal 100 performs configuration for implementing communications between the terminal 100 and the communication node 210, and transmits an RRC reconfiguration complete message (RRC Reconfiguration Complete) (S25).

Upon receiving the RRC Reconfiguration Complete, the communication node 210 transmits Dedicated Signaling (for example, a DL Information Transfer message) including the TSN time to the terminal 100 at a proper timing (S26).

As described above, in the present operation example, when the communication node 210 receives the information requesting for the delivery of TSN time from the terminal 100 in S21, the communication node 210 delivers the TSN time to the terminal 100 by using Dedicated Signalling in S26.

Note that, in this operation example, when the terminal 100 transitions from the active state to the inactive state, the terminal 100 is in the inactive state on the NG-RAN 200 side, but the terminal 100 is in the connected state (CM Connected) on the core network 300 side. Therefore, the terminal 100 does not need to transmit a resume request message to the core network 300 in the process of transitioning from the inactive state to the active state.

In the inactive state, the terminal 100, the communication node 210, and the core network 300 retain parameters (context information) necessary for implementing communications between the terminal 100 and the NR network. For this reason, in the process of transitioning from the inactive state to the active state, unlike in the process of transitioning from the idle state to the active state, the core network 300 does not need to transmit the Initial Context Setup Request to the communication node 210, and the communication node 210 does not need to transmit the Security Mode Command to the terminal 100.

(3.2.2) Operation Example 2

In this operation example, the terminal 100 includes in the RRC Resume Complete, the information for requesting for the delivery of TSN time in S23, instead of the information for requesting for the delivery of TSN time being included in the RRC Resume Request by the terminal 100 in S21.

In this case, upon receiving the information for requesting for the delivery of TSN time from the terminal 100 in S23, the communication node 210 delivers the TSN time to the terminal 100 by using Dedicated Signalling in S26.

Thus, it suffices if the terminal 100 can transmit information for requesting for delivery of TSN time to the communication node 210 in a step before S24 in which the radio bearer is configured between the terminal 100 and the communication node 210.

(3.3) Time Delivery Procedure 3

Next, a procedure in which the NG-RAN 200 delivers the TSN time to the terminal 100 in the process of switching (Xn handover) the communication node to which the terminal 100 is connected in the NG-RAN 200 will be described.

(3.3.1) Operation Example 1

Figure 6:
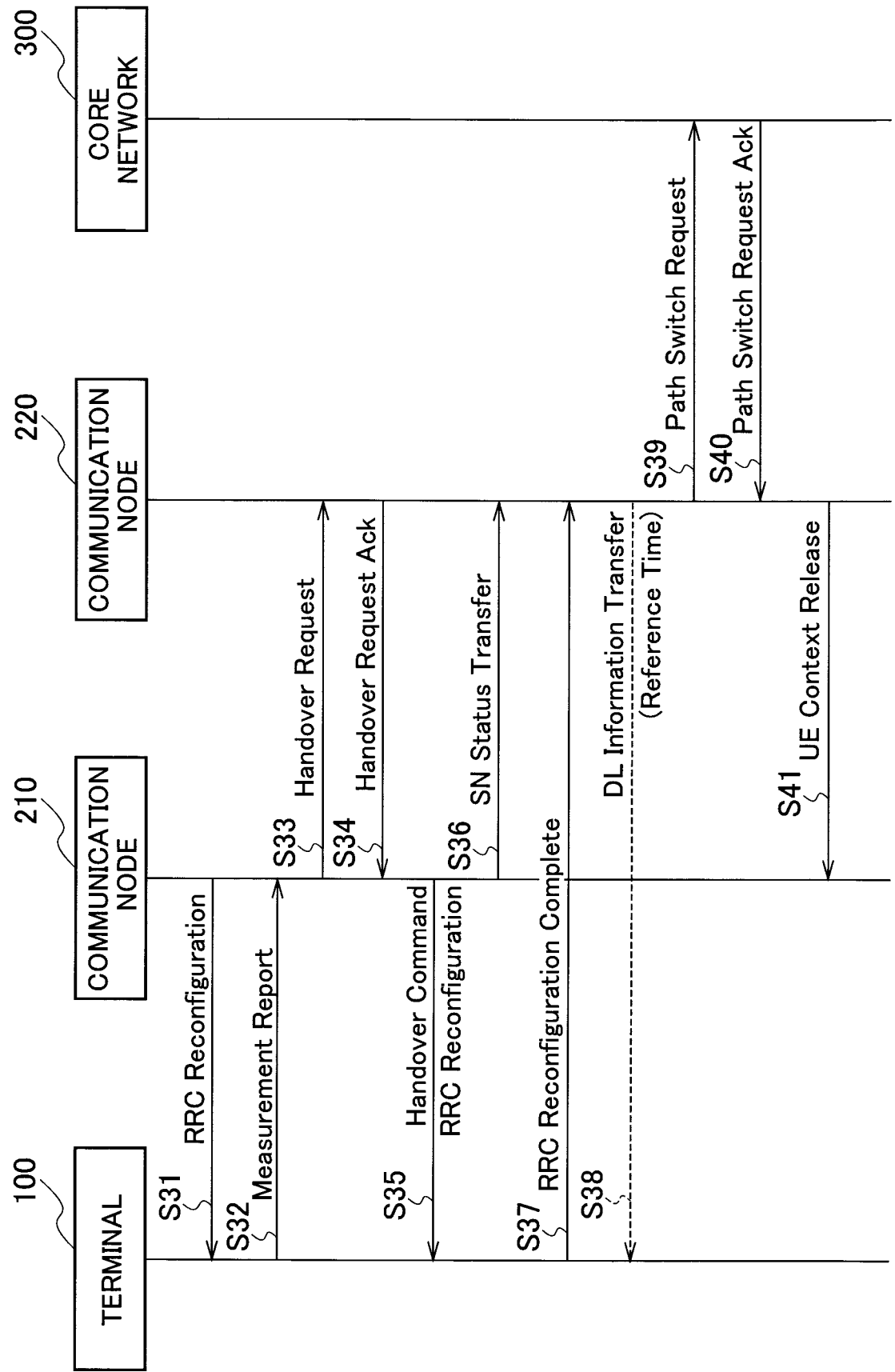
FIG. 6 is a diagram illustrating an example of a sequence of a time delivery procedure 3.

FIG. 6 is a diagram illustrating an example of a sequence of a time delivery procedure in a process of switching a communication node to which the terminal 100 is connected in the NG-RAN 200. As illustrated in FIG. 6, the terminal 100 is connected to the communication node 210, and receives an RRC reconfiguration message (RRC Reconfiguration) from the communication node 210 (S31).

The terminal 100 measures a reference signal transmitted from the cell subordinate to the communication node 220 at a proper timing, and transmits a Measurement Report to the communication node 210 when the measurement result satisfies a predetermined condition (S32).

When determining that the Xn handover is to be performed for the terminal 100 based on the Measurement Report, the communication node 210 transmits a handover request message (Handover Request) to the communication node 220 (S33).

In S33, the communication node 210 includes in the Handover Request, the terminal TSN subscription information retained by the communication node 210. The communication node 210 receives the terminal TSN subscription information from the core network 300, for example, in the process of configuring an RRC connection between the terminal 100 and the communication node 210.

Upon receiving the Handover Request, the communication node 220 transmits a handover request response message (Handover Request Ack) including configuration information necessary for the terminal 100 to execute the Xn handover, to the communication node 210 (S34).

Upon receiving the Handover Request ACK, the communication node 210 transmits a Handover Command to the terminal 100, for instructing the terminal 100 to switch the communication node to which the terminal 100 is connected from the communication node 210 to the communication node 220 by using the RRC Reconfiguration (S35).

After transmitting the Handover Command, the communication node 210 transmits an SN status transfer message (SN Status Transfer) to the communication node 220 for notifying the communication node 220 of the transfer status of the uplink data or the downlink data (S36).

Upon receiving the Handover Command, the terminal 100 transmits the RRC Reconfiguration Complete to the communication node 220 (S37). Upon receiving the RRC Reconfiguration Complete, the communication node 220 determines to deliver the TSN time to the terminal 100 if the terminal 100 is registered in the terminal TSN subscription information received in S33.

Upon determining to deliver the TSN time to the terminal 100, the communication node 220 transmits Dedicated Signaling (for example, a DL Information Transfer message) including the TSN time to the terminal 100 at a proper timing (S38).

The communication node 220 transmits a path switch request message (Path Switch Request), for requesting for switching of the data path configured between the communication node 210 and the core network 300, to the core network 300 (S39).

Upon receiving the Path Switch Request, the core network 300 drops the data path configured between the communication node 210 and the core network 300, and configures a data path between the communication node 220 and the core network 300, and then transmits a path switch request response message (Path Switch Request Ack) to the communication node 220 (S40).

Upon receiving the Patch Switch Request Ack, the communication node 220 transmits a UE context release message (UE Context Release) to the communication node 210 (S41).

Thus, in the present operation example, when determining that the terminal 100 is registered in the terminal TSN subscription information received in S33, the communication node 220 delivers the TSN time to the terminal 100 by using Dedicated Signalling in S38.

(3.3.2) Operation Example 2

In this operation example, the communication node 220 receives the terminal TSN subscription information from the core network 300 by using the Path Switch Request Ack in S40, instead of receiving the terminal TSN subscription information from the communication node 210 in S33.

In this case, when determining that the terminal 100 is registered in the terminal TSN subscription information received in S40, the communication node 220 delivers the TSN time to the terminal 100 by using Dedicated Signalling at a proper timing in or after S40.

(3.3.3) Operation Example 3

In this operation example, the communication node 220 receives the terminal TSN subscription information from the communication node 210 in S33, and receives the terminal TSN subscription information from the core network 300 by using the Path Switch Request Ack in S40.

When the terminal TSN subscription information received in S40 is different from the terminal TSN subscription information received in S33, the communication node 220 retains the latest TSN subscription information received in S40.

(3.3.4) Operation Example 4

Instead of receiving the terminal TSN subscription information from the communication node 210 in S33, the communication node 220 may receive the terminal TSN subscription information from the communication node 210 by using the SN Status Transfer in S36.

(3.4) Other

Next, a terminal TSN subscription information notification method in a context information modification procedure and a terminal TSN subscription information notification method in a context information retrieval procedure, will be described.

(3.4.1) Context Information Modification Procedure

First of all, the terminal TSN subscription information notification method in the context information modification procedure will be described. Specifically, the context information modification procedure is a procedure of modifying the context information retained by the communication node 210 in a case where the terminal 100 has transitioned to the inactive state from the active state where the RRC connection is configured between the terminal 100 and the communication node 210.

Figure 7:
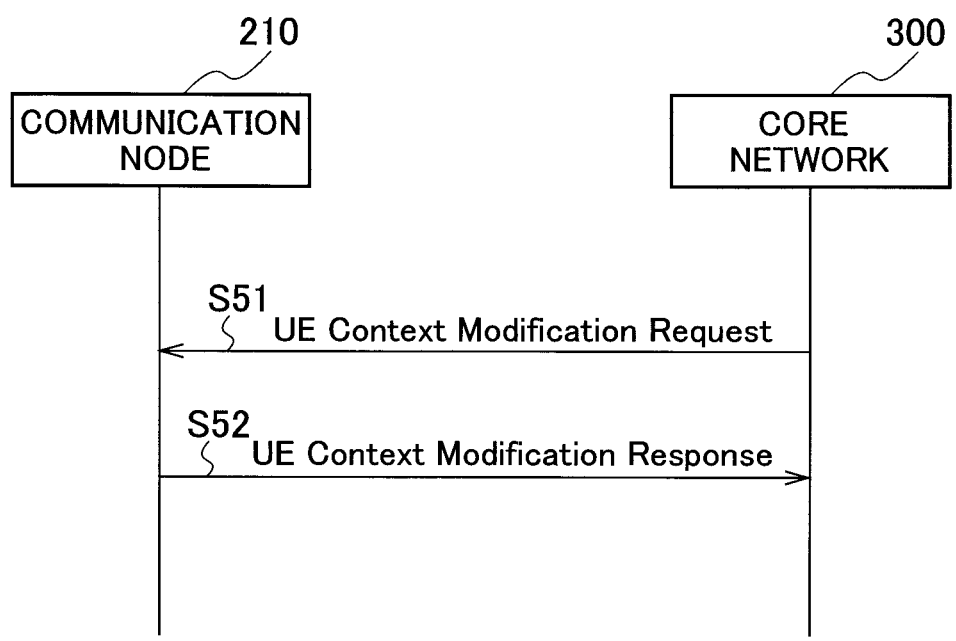
FIG. 7 is a diagram illustrating an example of a sequence of a context information modification procedure.

FIG. 7 is a diagram illustrating an example of a sequence of a context information modification procedure. As illustrated in FIG. 7, the core network 300 transmits a UE context modification request message (UE Context Modification Request) for requesting for a modification of context information to the communication node 210 (S51).

In S51, the core network 300 includes in the UE Context Modification Request, the terminal TSN subscription information.

Upon modifying the context information retained by the communication node 210 based on the UE Context Modification Request, the communication node 210 transmits a UE context modification response message (UE Context Modification Response) to the core network 300.

(3.4.2) Context Information Retrieval Procedure

Next, the terminal TSN subscription information notification method in the context information retrieval procedure will be described. Specifically, the context information retrieval procedure is a procedure in which the terminal 100 that is connected to the communication node 210 retrieves the context information when reconnecting to the communication node 220.

(3.4.2.1) Operation Example 1

Figure 8:
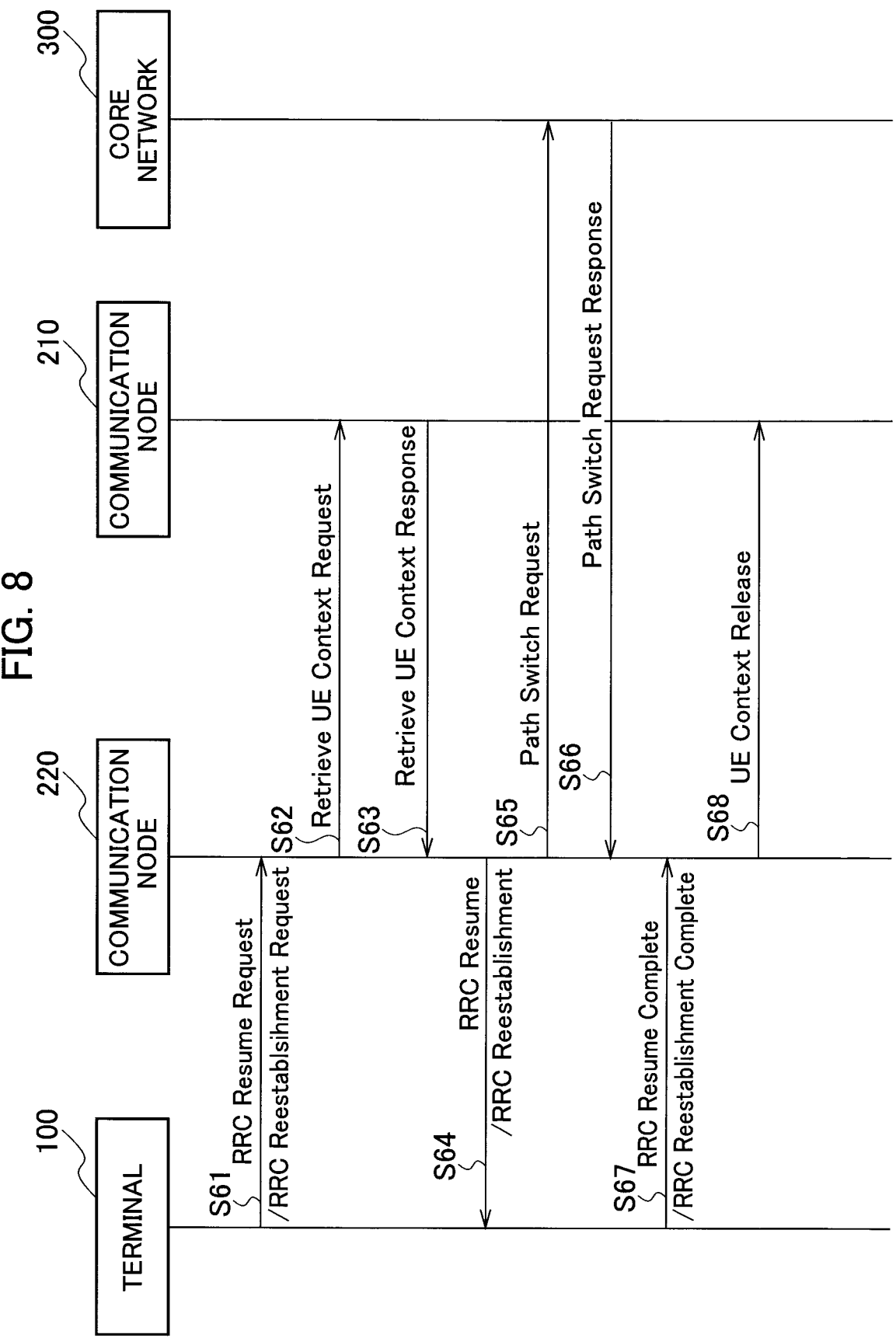
FIG. 8 is a diagram illustrating an example of a sequence of a context information retrieval procedure.

FIG. 8 is a diagram illustrating an example of a sequence of a context information retrieval procedure. As illustrated in FIG. 8, the terminal 100 transmits an RRC resume request message (RRC Resume Request) or an RRC reestablishment request message (RRC Reestablishment Request) to the communication node 220 for requesting for reconnection to the communication node 220 (S61).

Upon receiving the RRC Resume Request or the RRC Reestablishment Request, the communication node 220 transmits a UE context acquisition request message (Retrieve UE Context Request) for requesting for the retrieval of the context information retained by the communication node 210, to the communication node 210 (S62).

Upon receiving the Retrieve UE Context Request, the communication node 210 transmits a UE context retrieval response message (Retrieve UE Context Response) including the context information retained by the communication node 210, to the communication node 220 (S63).

The communication node 210 includes in the Retrieve UE Context Response, the terminal TSN subscription information retained by the communication node 210 in S63.

Upon receiving the Retrieve UE Context Response, the communication node 220 transmits an RRC resume message (RRC Resume) or an RRC reestablishment message (RRC Reestablishment) to the terminal 100 (S64).

Upon receiving the RRC Resume or the RRC Reestablishment, the communication node 220 transmits a path switch request message (Path Switch Request), for requesting for switching of the data path configured between the communication node 210 and the core network 300, to the core network 300 (S65).

Upon receiving the Path Switch Request, the core network 300 drops the data path configured between the communication node 210 and the core network 300, and configures a data path between the communication node 220 and the core network 300, and then transmits a path switch request response message (Path Switch Request Response) to the communication node 220 (S66).

Upon receiving the RRC Resume or the RRC Reestablishment, the terminal 100 transmits an RRC resume completion message (RRC Resume Complete) or an RRC reestablishment completion message (RRC Reestablishment Complete) to the communication node 220 (S67).

Upon receiving the RRC Resume Complete or the RRC Reestablishment Complete, the communication node 220 transmits a UE context release message (UE Context Release) to the communication node 210 (S68).

As described above, in the present operation example, the communication node 220 retrieves the terminal TSN subscription information from the communication node 210 in S63.

(3.4.2.2) Operation Example 2

In this operation example, the communication node 220 retrieves the terminal TSN subscription information from the core network 300 in S66 instead of retrieving the terminal TSN subscription information from the communication node 210 in S63.

In this case, the core network 30 includes in the Path Switch Request Response, the terminal TSN subscription information.

(3.3.3) Operation Example 3

In this operation example, the communication node 220 retrieves the terminal TSN subscription information from the communication node 210 in S63 and retrieves the terminal TSN subscription information from the core network 300 in S66.

When the terminal TSN subscription information received in S66 is different from the terminal TSN subscription information received in S63, the communication node 220 retains the latest TSN subscription information received in S66.

(4) Action and Effect

According to the above-described embodiment, the terminal 100 is connected to the NR network that communicates with the TSN. The terminal 100 includes the transmitting unit 101 that transmits a message for requesting for the delivery of TSN time for use in the TSN to the communication node 210 of the NR system 30 in which the NR time is used, and the receiving unit 103 that receives the TSN time from the communication node 210 of the NR system 30 by using Dedicated Signalling.

With such a configuration, the communication node 210 can recognize that the terminal 100 is requesting for the delivery of TSN time. Thus, the communication node 210 can deliver the time requested by the terminal by using Dedicated Signalling.

Furthermore, when the terminal 100 has requested for the delivery of TSN time, the communication node 210 configures a radio bearer for delivery of TSN time between the terminal 100 and the communication node 210, and delivers the TSN time. Thus, the communication node 210 can be reliably prevented from delivering time or configuring the radio bearer not requested by the terminal 100.

According to the above-described embodiment, the communication node 210 includes the receiving unit 213 that receives the terminal TSN subscription information, the controlling unit 217 that determines to deliver the TSN time for use in the TSN to the terminal 100 based on the terminal TSN subscription information, and the transmitting unit 211 that transmits the TSN time to the terminal 100 by using Dedicated Signalling.

Also with such a configuration, the communication node 210 can recognize that the terminal 100 is requesting for the delivery of TSN time. Thus, the communication node 210 can deliver the time requested by the terminal by using Dedicated Signalling.

According to the above-described embodiment, the receiving unit 213 receives, from the terminal 100, a message for requesting for the delivery of TSN time, and the controlling unit 217 determines to deliver the TSN time to the terminal 100 when the terminal 100 requesting for the delivery of TSN time is registered in the terminal TSN subscription information.

With such a configuration, the communication node 210 can confirm whether the terminal requesting for the delivery of TSN time actually supports the TSN. Therefore, the communication node 210 can be reliably prevented from delivering the TSN time to a terminal that does not support TSN.

According to the above-described embodiment, the communication node 210 includes the receiving unit 213 that receives the handover request message including the terminal TSN subscription information, the controlling unit 217 that determines to deliver the TSN time for use in the TSN to the terminal 100 based on the terminal TSN subscription information, and the transmitting unit 211 that transmits the TSN time to the terminal 100 by using Dedicated Signalling when the terminal 100 is handed over to the communication node 210.

With such a configuration, the communication node as the handover destination can recognize that the terminal 100 is requesting for the delivery of TSN time. Thus, the terminal 100 can receive the time requested by the terminal by using Dedicated Signalling, even when the communication node to which the terminal 100 is connected is switched.

(5) Other Embodiments

Although the contents of the present invention have been described according to the embodiments, the present invention is not limited to the description of these, and it is obvious to those skilled in the art that various modifications and improvements can be made.

In the above-described embodiment, the NR system is used for a stand-alone (SA) operation and thus includes the NG-RAN, but is not limited to this configuration. For example, the NR system may include an Evolved Universal Terrestrial Radio Access Network (E-UTRAN) instead of the NG-RAN, to be used for a non-standalone (NSA) operation.

Figure 9:
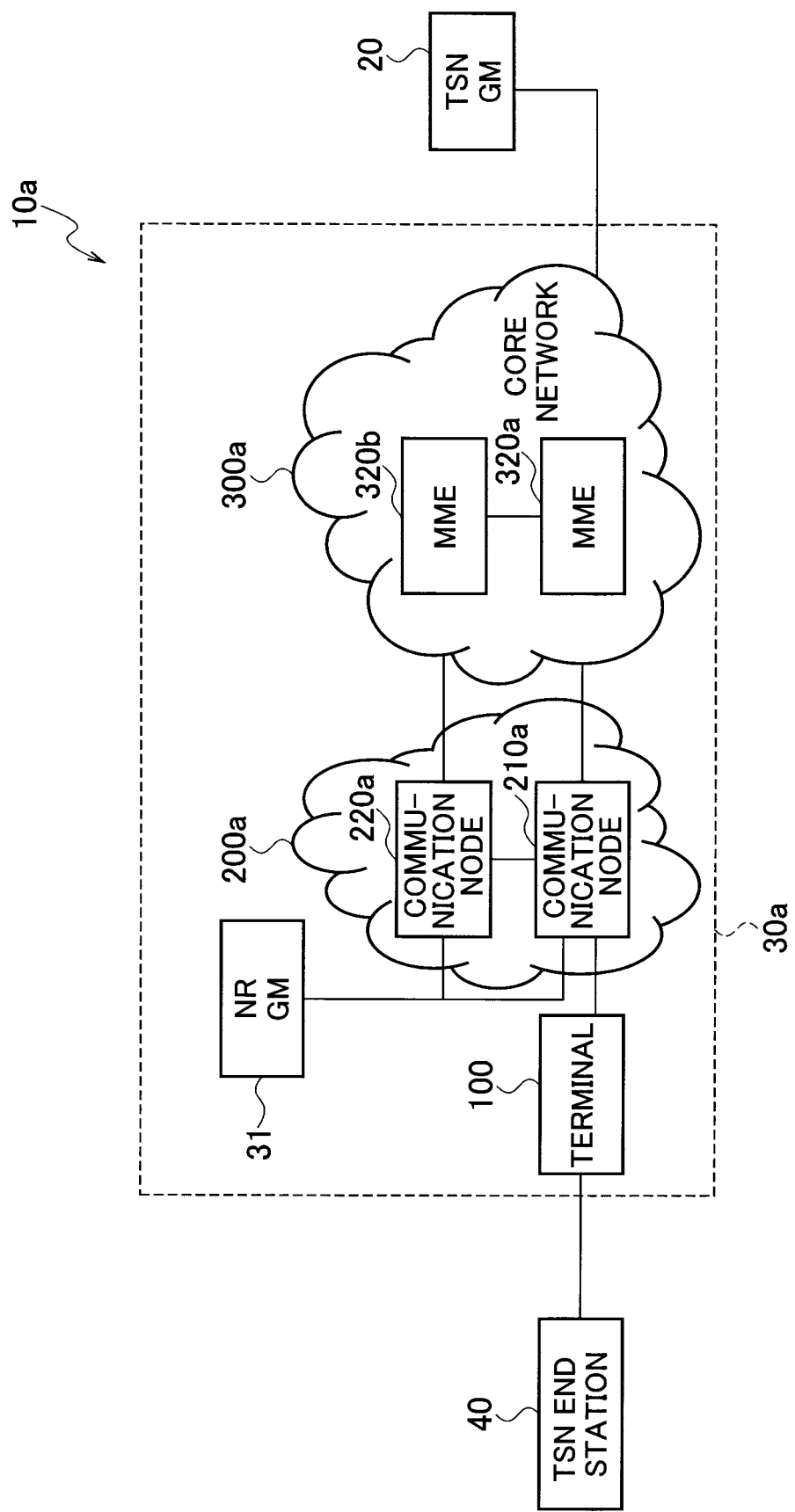

FIG. 9 is a diagram schematically illustrating an overall configuration of a control system 10a. As illustrated in FIG. 9, the control system 10a includes an NR system 30a. The NR system 30a includes an NR GM 31, a terminal 100, an E-UTRAN 200a, and a core network 300a.

The E-UTRAN 200a includes a plurality of E-UTRAN Nodes (specifically, en-gNBs (or eNBs)), and is connected to the core network (EPC) 300a based on LTE. The E-UTRAN 200a includes communication nodes 210a and 220a. Each of the communication nodes 210a and 220a is an en-gNB or an eNB.

The core network 300a communicates with UE 100 via at least one of the communication nodes 210a and 220a. The core network 300a includes Mobility Management Entities (MMEs) 320a and 320b. The MMEs 320a and 320b perform mobility management for the terminal 100.

In the embodiment described above, in the time delivery procedure 1, the communication node 210 and the core network 300 are used (see FIG. 4). The communication node 210a and the core network 300a may be used instead of the communication node 210 and the core network 300.

In the embodiment described above, in the time delivery procedure 2, the communication node 210 is used (see FIG.

5). The communication node 210*a* and the core network 300*a* may be used instead of the communication node 210. In this case, the terminal 100 is in the inactive state also on the core network 300*a* side, and thus the terminal 100 needs to transmit a recovery request message to the core network 300 in the process of transitioning from the inactive state to the active state.

Figure 10:
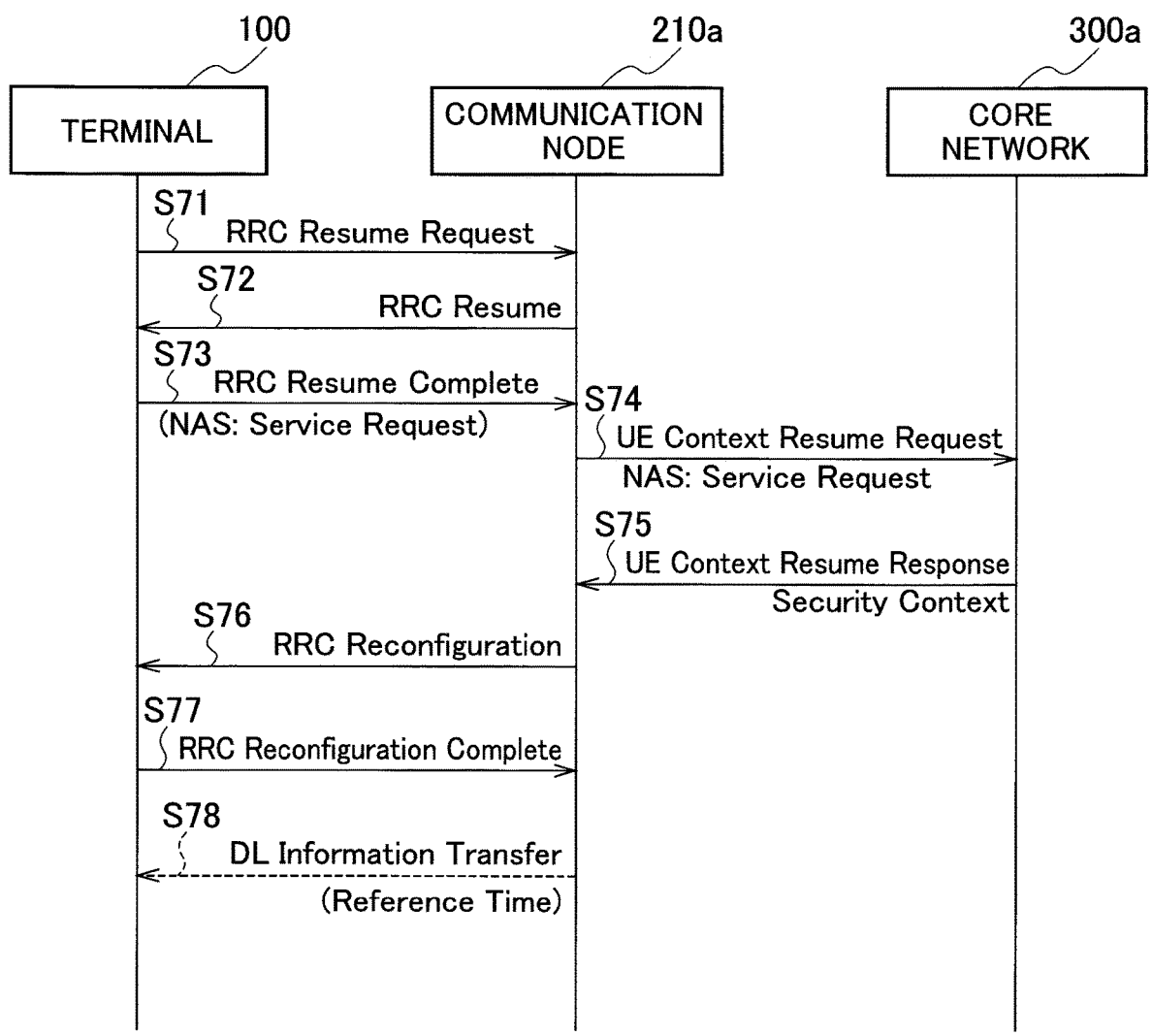
FIG. 10 is a diagram illustrating an example of a sequence of a time delivery procedure 2 according to a modification.

FIG. 10 is a diagram illustrating an example of a sequence of a time delivery procedure 2 according to the modification. Note that S71, S72, and S76 to S78 illustrated in FIG. 10 correspond to S21, S22, and S24 to S26 illustrated in FIG. 5.

Upon receiving the RRC Resume, the communication node 210*a* transmits a Service Request by using an NAS message to notify the core network 300*a* of the recovery of the context information via the communication node 210*a*, together with the RRC Resume Copmlete (S73).

The communication node 210*a* acknowledges that the terminal 100 has received the RRC connection configuration information by receiving the RRC Resume Complete. Upon receiving the Service Request, the communication node 210*a* transmits a UE context recovery request message (UE Context Resume Request) to the core network 300*a* by using a NAS message (S74). The UE Context Resume Request contains the contents of the Service Request.

Upon receiving the UE Context Resume Request, the core network 300*a* transmits a UE context recovery response message (UE Context Resume Response) including the security context information to the communication node 210*a* (S75). As a result, the terminal 100 is in the active state on the core network 300*a* side.

In the embodiment described above, in the time delivery procedure 3, the communication nodes 210 and 220 and the core network 300 are used (see FIG. 6). The communication nodes 210*a* and 220*a* and the core network 300*a* may be used instead of the communication nodes 210 and 220 and the core network 300. In this case, the MME 320*a* or MME 320*b* includes the communication node 210*a* or 220*a*.

A process, in the NG-RAN 200, in which the communication nodes 210 and 220 directly transmit and receive information about the terminal 100 to and from each other by using an Xn interface, to switch the communication node to which the terminal 100 is connected, is referred to as Xn handover. A process, in the E-UTRAN 200*a*, in which the communication nodes 210*a* and 220*a* directly transmit and receive information about the terminal 100 to and from each other by using an X2 interface, to switch the communication node to which the terminal 100 is connected, is referred to as X2 handover.

On the other hand, when the MME 320*a* includes the communication node 210*a* and the MME 320*b* includes the communication node 210*b*, the communication nodes 210*a* and 220*a* transmit and receive the information about the terminal 100 via the core network 300*a*, to switch the communication node to which the terminal 100 is connected. This process is referred to as S1 handover.

Figure 11:
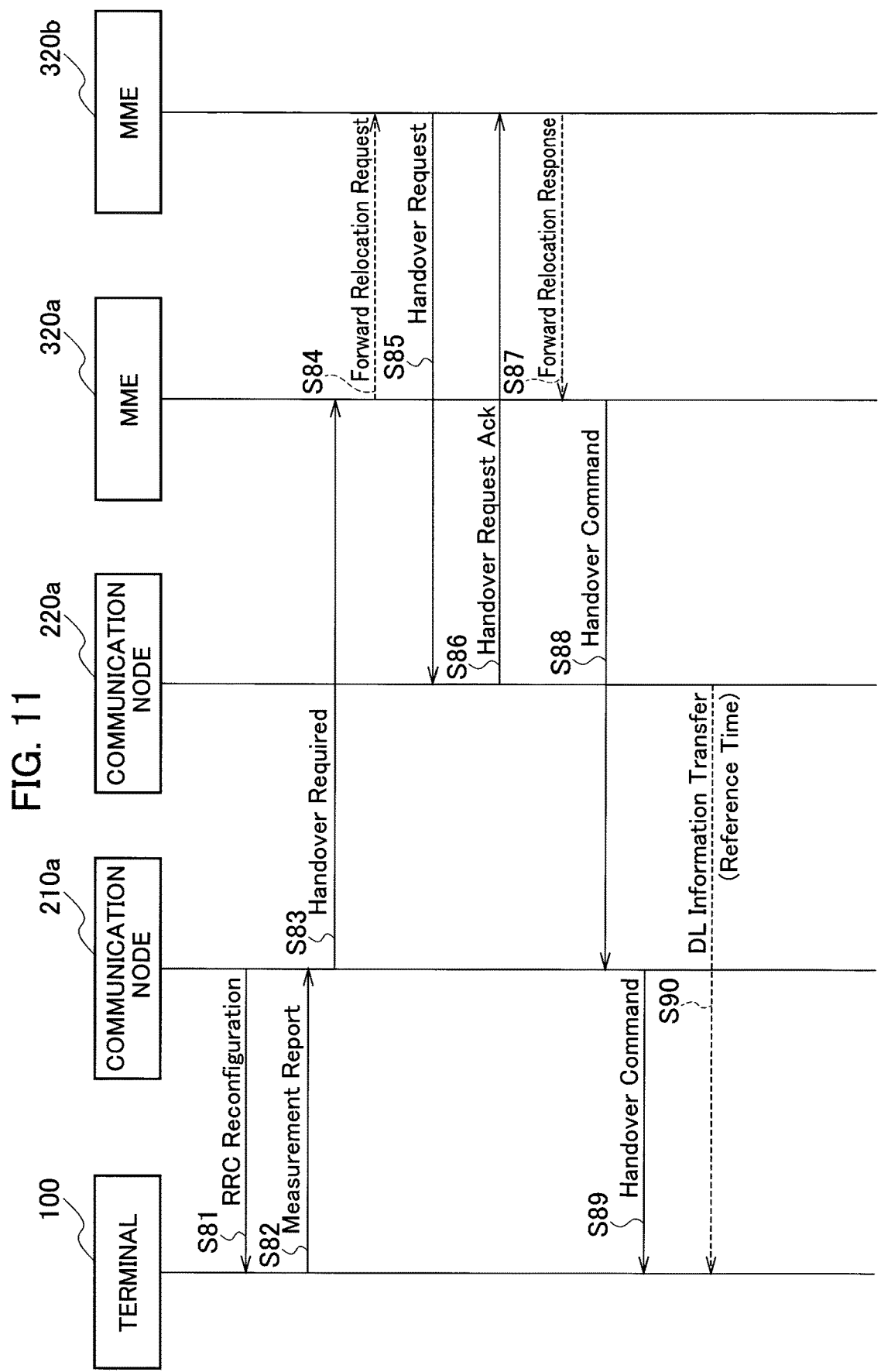
FIG. 11 is a diagram illustrating an example of a sequence of a time delivery procedure 3 according to the modification.

FIG. 11 is a diagram illustrating an example of a sequence of a time delivery procedure 3 according to the modification. Note that S81 and S82 illustrated in FIG. 11 correspond to S31 and S32 illustrated in FIG. 6.

When determining that the S1 handover is to be performed for the terminal 100 based on the Measurement Report, the communication node 210*a* transmits a handover request message (Handover Required) to the MME 320*a* (S83).

Upon receiving the Handover Required, MME 320*a* transmits a forward relocation request message (Forward Relocation Request) to the MME 320*b* (S84). Upon receiving the Forward Relocation Request, the MME 320*b* transmits a handover request message (Handover Request) to the communication node 220*a* (S85).

The MME 320*b* includes in the Handover Request, the terminal TSN subscription information in S85.

Upon receiving the Handover Request, the communication node 220*a* transmits a handover request acknowledgement message (Handover Request Ack) to the MME 320*b* (S86).

Upon receiving the Handover Request ACK, the MME 320*b* transmits a forward relocation response message (Forward Relocation Response) to the MME 320*a* (S87).

Upon receiving the Forward Relocation Response, the MME 320*a* transmits Handover Command to the communication node 210*a* (S88). Upon receiving the Handover Command, the communication node 210*a* transmits the Handover Command to the terminal 100 (S89).

When the communication node 220*a* determines that the terminal 100 is connected to the communication node 220*a* and that the terminal 100 is registered in the terminal TSN subscription information received in S85, the communication node 220*a* delivers the TSN time to the terminal 100.

Upon determining to deliver the TSN time to the terminal 100, the communication node 220*a* transmits Dedicated Signaling (for example, a DL Information Transfer message) including the TSN time to the terminal 100 at a proper timing (S90).

Thus, in the present modification, when determining that the terminal 100 is registered in the terminal TSN subscription information received in S85, the communication node 220*a* delivers the TSN time to the terminal 100 by using Dedicated Signalling in S90.

In the embodiment described above, in the context information modification procedure, the communication node 210 and the core network 300 are used (see FIG. 7). The communication node 210*a* and the core network 300*a* may be used instead of the communication node 210 and the core network 300.

In the embodiment described above, in the context information retrieval procedure, the communication nodes 210 and 220 and the core network 300 are used (see FIG. 8). The communication nodes 210*a* and 220*a* and the core network 300*a* may be used instead of the communication nodes 210 and 220 and the core network 300. In this case, the MME 320*a* or MME 320*b* includes the communication node 210*a* or 220*a*.

The block diagrams used for explaining the embodiments (FIG. 2 and FIG. 3) illustrates blocks of functional unit. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting may be called a transmitting unit or a transmitter. For any of the above, as explained above, the realization method is not particularly limited to any one method.

Figure 12:
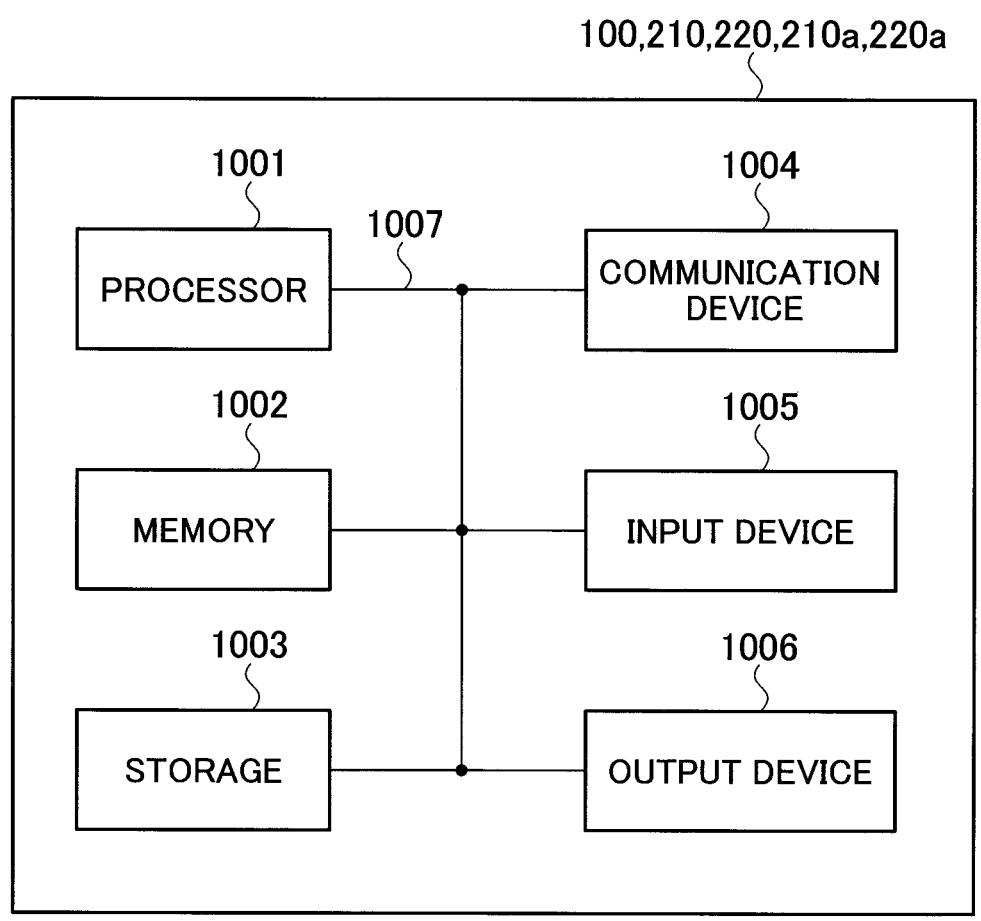

Furthermore, the terminal 100 and the communication nodes 210, 220, 210a, and 220a described above may function as a computer that performs processing of the wireless communication method according to the present disclosure. FIG. 12 is a diagram illustrating an example of a hardware configuration of the device. As illustrated in FIG. 12, the device can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices illustrated in the figure, or can be constituted by without including a part of the devices.

The functional blocks of the device can be realized by any of hardware elements of the computer device or a desired combination of the hardware elements.

Moreover, the processor 1001 performs operation by loading predetermined software (computer program) on hardware such as the processor 1001 and the memory 1002, and realizes various functions of the device by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, an operation device, a register, and the like.

Moreover, the processor 1001 reads a computer program (program code), a software module, data, and the like from the storage 1003 and/or the communication device 1004 into the memory 1002, and executes various processing according to the data. As the computer program, a computer program that is capable of executing on the computer at least a part of the operation explained in the above embodiments is used. Alternatively, various processing explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main memory), and the like. The memory 1002 can store therein a computer program (computer program codes), software modules, and the like that can execute the method according to the embodiment of the present disclosure.

The storage 1003 is a computer readable recording medium. Examples of the storage 1003 include at least any one of an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like.

The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 can be constituted by a single bus or can be constituted by separate buses between the devices.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these kinds of hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), higher layer signaling (for example, RRC signaling, Medium Access Control (MAC) signaling, broadcast information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information and signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when software is transmitted from a website, a server, or some other remote source by using at least one of a wired technology (coaxial cable, optical fiber cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be instructed by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can include one or more (for example, three) cells (also called sectors). In a configuration in which the base station includes a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using at least any one of one or more wires, cables, printed electrical connections, and as some non-limiting and non-exhaustive examples, by using electromagnetic energy having wavelengths in the radio frequency domain, the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as "a", "an", and "the" in English are added, in this disclosure, these articles shall include plurality of nouns following these articles.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

INDUSTRIAL APPLICABILITY

The terminal and the communication node described above are advantageous in that they can transmit and receive time information requested by a terminal supporting a particular network to and from each other by using dedicated signaling.

EXPLANATION OF REFERENCE NUMERALS 10, 10a Control system
20 TSN GM
30 NR system
31 NR GM
40 TSN end station
100 Terminal
101 Transmitting unit
103 Receiving unit
105 Controlling unit
200 NG-RAN
200a E-UTRAN
210, 220, 210a, 210a Communication node
211 Transmitting unit
213 Receiving unit
215 Managing unit
217 Controlling unit
300 Core network
310 UPF
320 AMF
320a, 320b MME
1001 Processor
1002 Memory
1003 Storage
1004 Communication device
1005 Input device
1006 Output device
1007 Bus

The invention claimed is:

1. A communication node comprising:
a receiver that receives, from a core network, a request for delivery of time information to a terminal based on subscription information indicating registration of the terminal in the core network, the subscription information being retained by the core network;
a processor that includes the time information in dedicated signaling when the request for delivery is received; and
a transmitter that transmits the time information to the terminal by using the dedicated signaling.

2. The communication node according to claim 1, wherein the receiver receives the request for delivery in a process in which the terminal transitions from an idle state to an active state.

3. The communication node according to claim 1, wherein the receiver receives Initial Context Setup Request including the request for delivery therein.

4. A terminal comprising:
a receiver that receives time information from a communication node by using dedicated signaling; and
a processor that performs time synchronization based on the time information,
wherein the time information is transmitted from the communication node that received a request for delivery to the terminal which was transmitted from a core network based on subscription information indicating registration of the terminal in the core network, the subscription information being retained by the core network.

5. The terminal according to claim 4, further comprising:
a transmitter that transmits to the communication node, a message for requesting for delivery of the time information.

6. A radio communication system comprising:
a core network, a communication node, and a terminal,
the core network transmits to the communication node, a request for delivery of time information to the terminal based on subscription information indicating registration of the terminal in the core network, the subscription information being retained by the core network,
the communication node includes:
- a receiver that receives the request for delivery from the core network;
- a processor that includes the time information in dedicated signaling when the request for delivery is received; and
- a transmitter that transmits the time information to the terminal by using the dedicated signaling, and the terminal includes a receiver that receives the time information from the communication node by using the dedicated signaling.

7. A radio communication method comprising:

receiving, by a communication node, from a core network, a request for delivery of time information to a terminal based on subscription information indicating registration of the terminal in the core network, the subscription information being retained by the core network;

including, by the communication node, the time information in dedicated signaling when the request for delivery is received; and transmitting, by the communication node, the time information to the terminal by using the dedicated signaling.

* * * * *